United States Patent
Sato

(10) Patent No.: US 11,186,278 B2
(45) Date of Patent: Nov. 30, 2021

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 101 days.

(21) Appl. No.: 16/791,729

(22) Filed: Feb. 14, 2020

(65) Prior Publication Data

US 2020/0269839 A1 Aug. 27, 2020

(30) Foreign Application Priority Data

Feb. 22, 2019 (JP) .............................. JP2019-030600

(51) Int. Cl.
*B60W 30/16* (2020.01)
*B60W 30/14* (2006.01)
(Continued)

(52) U.S. Cl.
CPC ............ *B60W 30/16* (2013.01); *B60W 10/20* (2013.01); *B60W 30/12* (2013.01);
(Continued)

(58) Field of Classification Search
CPC .... B60W 30/16; B60W 30/143; B60W 10/20; B60W 50/14; B60W 50/10; B60W 40/04;
(Continued)

(56) References Cited

U.S. PATENT DOCUMENTS

| 8,577,553 | B2 | 11/2013 | Nitta et al. |
| 9,308,194 | B2 | 4/2016 | Lingard et al. |

(Continued)

FOREIGN PATENT DOCUMENTS

| DE | 102012211901 | 1/2014 |
| DE | 102016009709 | 2/2017 |

(Continued)

OTHER PUBLICATIONS

Office Action dated Jun. 7, 2021 issued in India Patent Application No. 202014006718.

(Continued)

*Primary Examiner* — Jason Holloway
(74) *Attorney, Agent, or Firm* — Cozen O'Connor

(57) ABSTRACT

An ACC function for performing constant speed cruise according to a target speed when there is no preceding other vehicle in a vehicle's own driving lane and performing following cruise by maintaining a predetermined inter-vehicle distance when there is a preceding other vehicle, an LKA function for maintaining cruise in the vehicle's own driving lane by following control to a target path, a function for performing automated lane change to a neighboring lane when there is no other vehicle in a predetermined range in the neighboring lane, an override function for stopping the automated lane change function by a driver's operation intervention, and a function for performing fallback control of the automated lane change function, with notifying the driver of stopping the automated lane change function and operation takeover.

5 Claims, 10 Drawing Sheets

(51) Int. Cl.
  *B60W 10/20* (2006.01)
  *B60W 50/14* (2020.01)
  *G05D 1/02* (2020.01)
  *B60W 50/10* (2012.01)
  *B60W 40/04* (2006.01)
  *B60W 30/12* (2020.01)

(52) U.S. Cl.
  CPC .......... *B60W 30/143* (2013.01); *B60W 40/04* (2013.01); *B60W 50/10* (2013.01); *B60W 50/14* (2013.01); *G05D 1/0223* (2013.01)

(58) Field of Classification Search
  CPC ............. B60W 30/12; B60W 60/0053; B60W 60/0059; B60W 50/0097; B60W 2552/40; B60W 2554/406; B60W 2552/53; B60W 2552/10; B60W 2540/103; B60W 2540/12; B60W 2540/18; B60W 2050/0072; B60W 2050/007; B60W 2050/0073; B60W 30/18163; B60W 30/14; G05D 1/0223
  See application file for complete search history.

(56) References Cited

U.S. PATENT DOCUMENTS

| | | | |
|---|---|---|---|
| 9,308,914 | B1 | 4/2016 | Sun et al. |
| 9,637,107 | B2 | 5/2017 | Matsuno et al. |
| 9,665,779 | B2 | 5/2017 | Ooi |
| 9,809,164 | B2 | 11/2017 | Matsuno et al. |
| 2011/0241862 | A1* | 10/2011 | Debouk .............. B60W 50/035 340/439 |
| 2015/0120144 | A1 | 4/2015 | De Bruin et al. |
| 2016/0207537 | A1* | 7/2016 | Urano .................. B60W 50/16 |
| 2017/0349173 | A1 | 7/2017 | Nishiguchi et al. |
| 2019/0227546 | A1 | 7/2019 | Sato |
| 2020/0207348 | A1* | 7/2020 | Sato .................. B60W 60/0053 |

FOREIGN PATENT DOCUMENTS

| | | |
|---|---|---|
| JP | 2009-149255 | 7/2009 |
| JP | 2012-096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-030479 | 3/2018 |
| JP | 2018-151287 | 9/2018 |
| JP | 2018-158684 | 10/2018 |
| JP | 2019-051894 | 4/2019 |
| JP | 2019-127136 | 8/2019 |
| WO | WO 2009/086857 | 7/2009 |

OTHER PUBLICATIONS

Office Action dated Oct. 7, 2021 issued in related U.S. Appl. No. 16/597,540.

\* cited by examiner

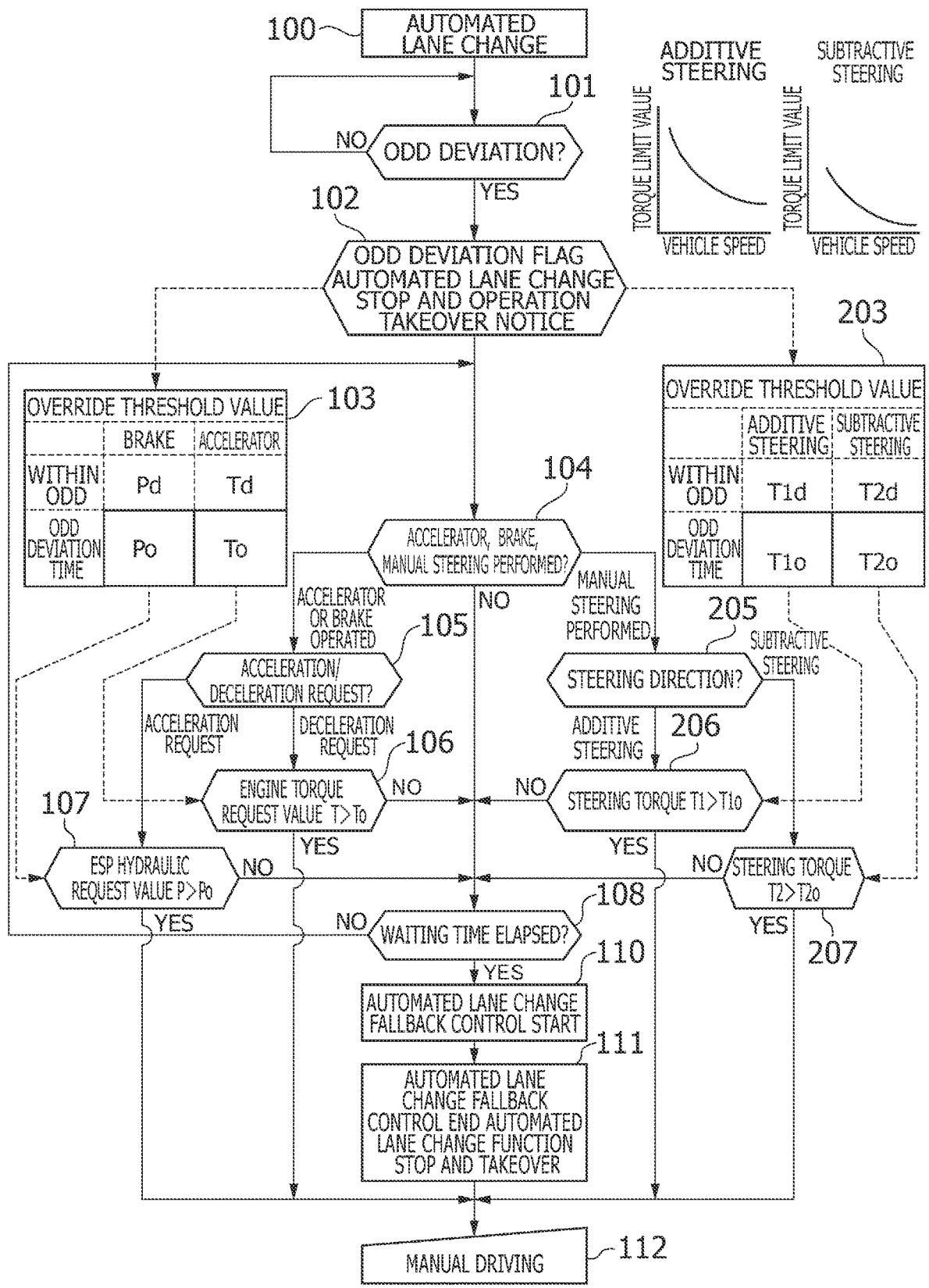

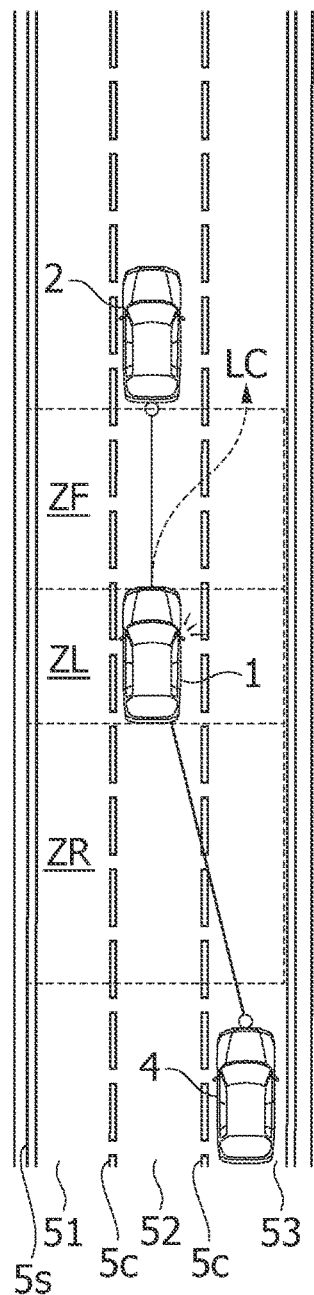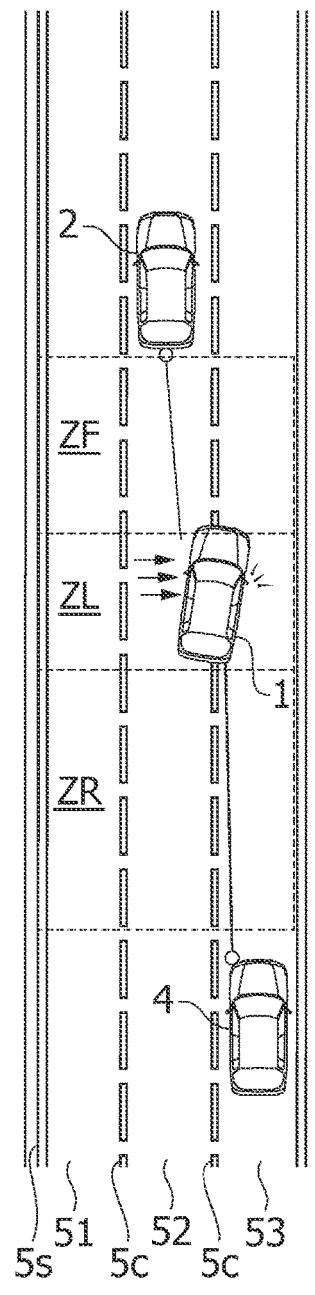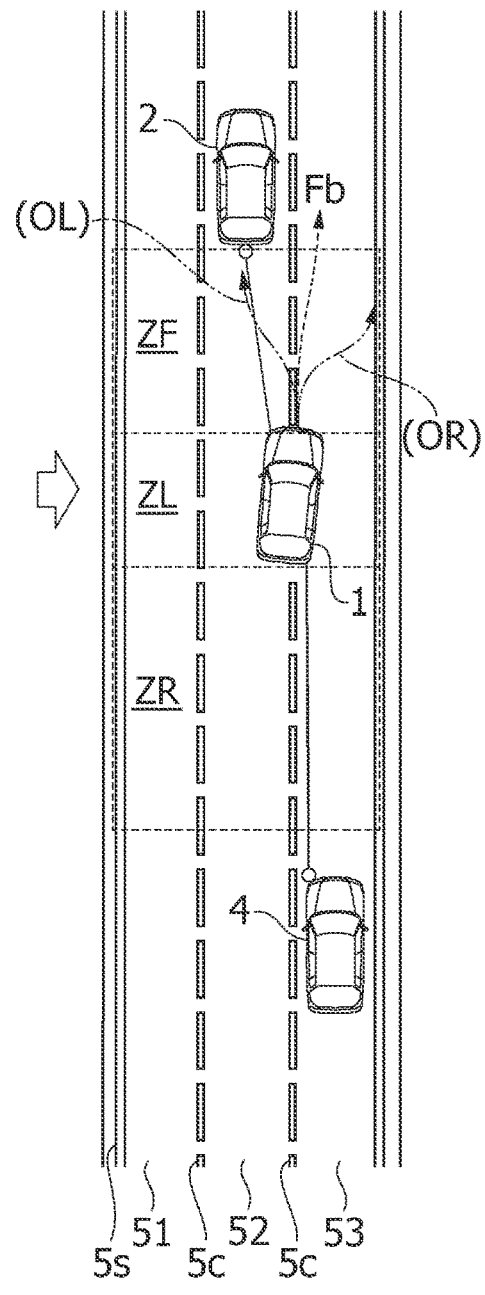

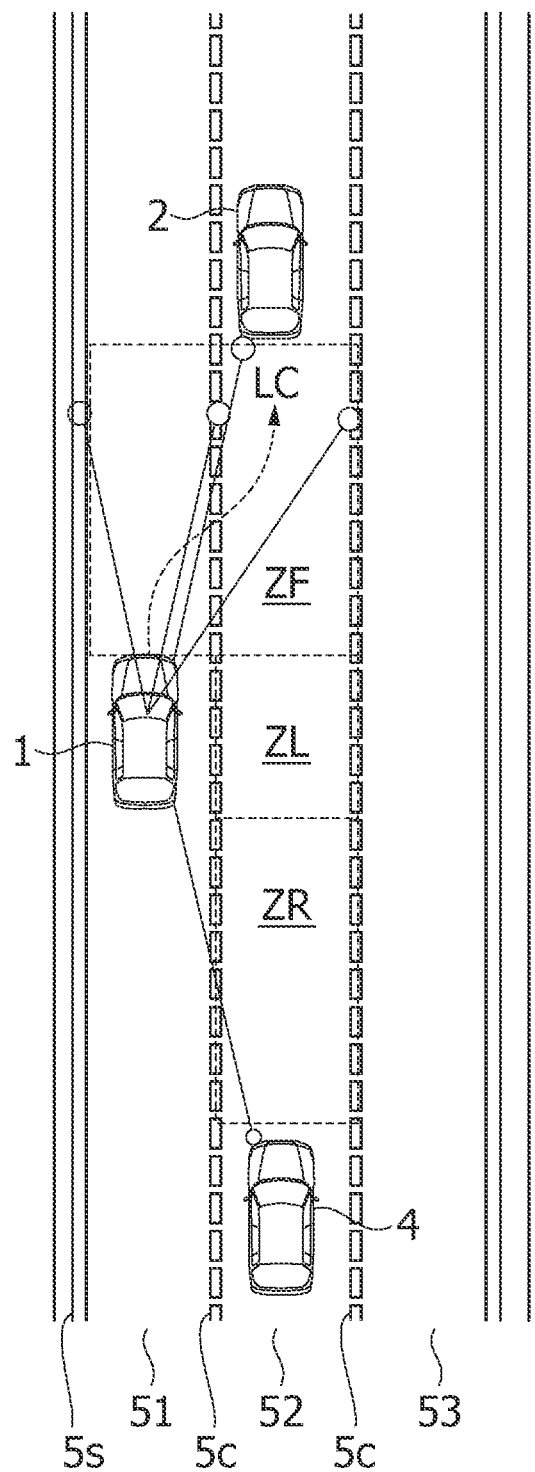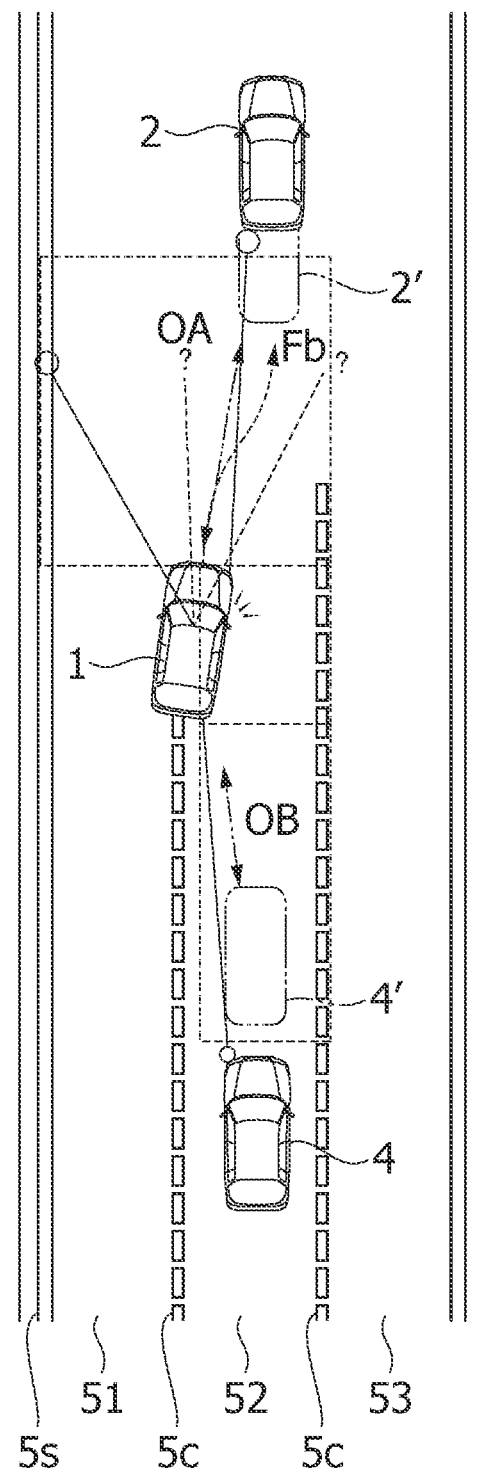

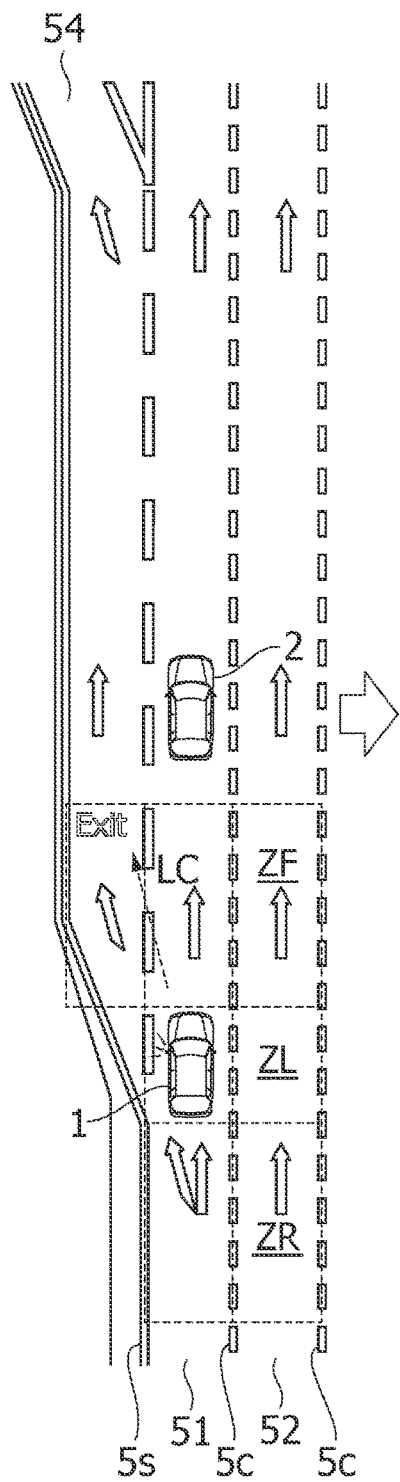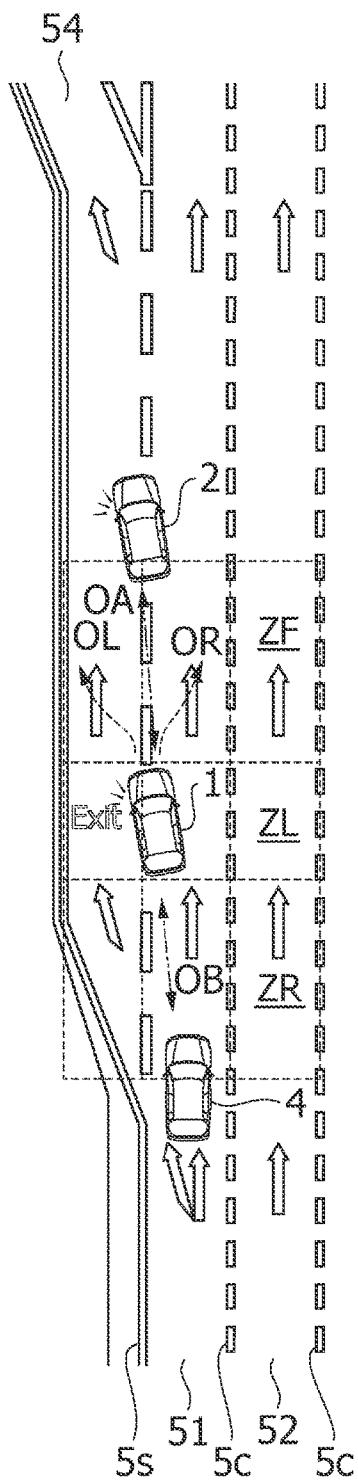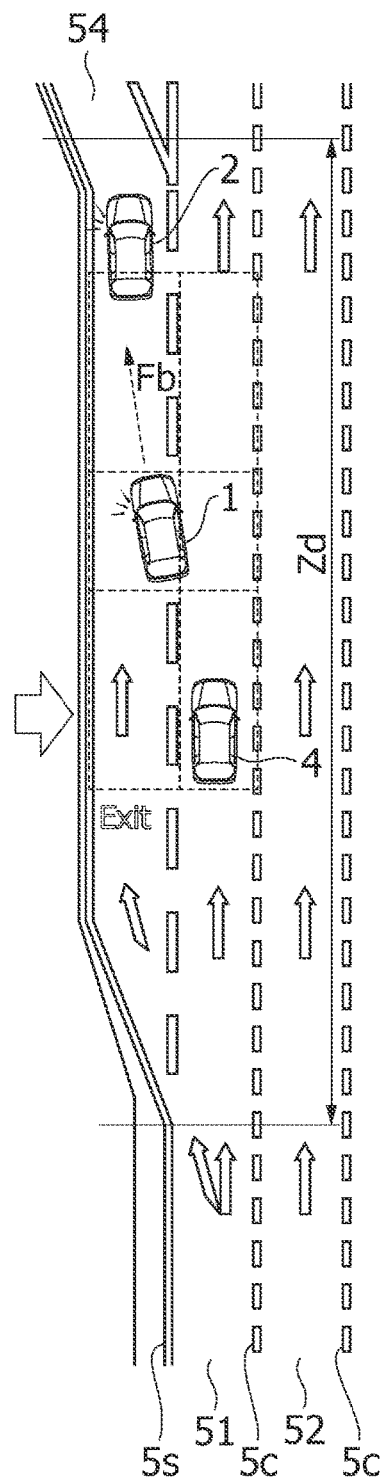

DRIVING CONTROL APPARATUS FOR VEHICLE

FIELD OF THE INVENTION

The present invention relates to a driving control apparatus for a vehicle, and more particularly, relates to an override function in a partially automated lane change system.

DISCUSSION OF THE RELATED ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)" and a "partially automated lane change system (PALS)" based on these techniques are being promoted.

Such a driving control system is only for the purpose of driving support and is different from completely automatic driving. A driver is required to place hands on the steering wheel and keep track of the driving situation so as to be able to manually drive at any time, the driver needs to respond in accordance with the situation, and the driving control system has an override function that switches to manual driving by the driver's operation intervention even while the system is operating. Patent Literature 1 discloses a vehicle lateral movement control device that determines change speed (fallback speed) of a fallback control amount to shift to manual driving according to change speed of a steering operation amount input by a driver.

In JP 2012-096569, if the change in speed of the steering operation amount is large, it is regarded as steering intervention intended by the driver and driving is shifted to manual driving in a short time, and if the change in speed of the steering operation amount is small, fallback control is performed relatively taking more time, and driving is shifted to manual driving. However, the large change in speed of the steering operation amount does not necessarily mean steering intervention intended by the driver, nor does fallback control corresponding to the change in speed of the steering operation amount necessarily mean control suitable for the movement state of the vehicle.

For example, in the partially automated lane change system (PALS), an operational design domain (ODD) which is a condition allowing for execution of automated lane change is defined by a designer's intention, and if a driving condition of the vehicle deviates from the ODD during automated lane change, the driver is notified of automated lane change function stop advance notice and an operation takeover request, and ACC and automatic steering fallback control is started after the elapse of several seconds.

When the driver is notified of the automated lane change function stop advance notice and the operation takeover request due to ODD deviation, it may be assumed that behavior of the vehicle becomes unstable due to override by excessive steering operation or override by excessive brake operation/accelerator operation of the driver who is overwhelmed by the notification.

For example, as shown in FIG. 5B, if a vehicle 1 receives a gust of wind from a lateral direction during automated lane change and it is determined that the driving condition has deviated from the ODD, the driver is notified of the automated lane change stop and the steering and braking/driving takeover request, and if the driver who is overwhelmed by the notification performs excessive left steering (subtractive steering) to cause override, the behavior may become unstable due to steering and the vehicle may deviate to a left lane as indicated by a reference sign OL in FIG. 5C. In addition, if the driver who is overwhelmed by the notification performs excessive right steering (additive steering) to cause override, the behavior may become unstable due to steering and the vehicle may deviate to a right lane as indicated by a reference sign OR in FIG. 5C.

Furthermore, as shown in FIG. 6B, if the driver who is overwhelmed by the notification performs excessive braking operation to cause override, the behavior may become unstable due to deceleration and the vehicle may come close to a following vehicle 4 (4') as indicated by a reference sign OB in FIG. 6C. In addition, if the driver who is overwhelmed by the notification performs excessive accelerator operation to cause override, acceleration may cause the vehicle to come close to a preceding vehicle 2 (2') or cause the vehicle to deviate from the lane as indicated by a reference sign OA in FIG. 6C.

SUMMARY OF THE INVENTION

The present invention has been made in view of the above-described actual situation, and an object is to prevent acceleration/deceleration and lane departure due to excessive operation intervention during a transition process to fallback control by system operational design domain deviation during automated lane change.

In order to solve the above-described problems, an embodiment of the present invention is directed to a driving control apparatus for a vehicle, including:

an environmental condition estimating part including a surrounding recognition function for recognizing a vehicle's lane and neighboring lanes and other vehicles in the lanes and a function for obtaining the vehicle's moving state;

a path generating part for generating a target path on the basis of information obtained by the environmental condition estimating part; and a vehicle control part for performing speed control and steering control for causing the vehicle to follow the target path, and having:

an ACC function for performing constant speed cruise according to the target speed when there is no preceding other vehicle in the vehicle's lane and performing following cruise by maintaining the predetermined inter-vehicle distance when there is a preceding other vehicle;

an LKA function for maintaining cruise in the vehicle's lane by following control to the target path;

a function for performing automated lane change to a neighboring lane when there is no other vehicle in a predetermined range in the neighboring lane;

an override function for stopping the automated lane change function by a driver's operation intervention; and a function for performing fallback control of the automated lane change function, with notifying the driver of stopping the automated lane change function and operation takeover, at a time of deviation of a system operational design domain during operation of the automated lane change function, characterized in that override threshold values serving as a determination criterion of the operation intervention for stopping the automated lane change function at the time of deviation of the system operational design domain are configured to be altered to a value greater than during normal operation within the system operational design domain.

According to the driving control apparatus for the vehicle according to the present invention, because the override threshold values serving as the determination criterion of operation intervention related to steering and braking/driving are altered to a value greater than during normal operation within the system operational design domain when a driving condition is determined to be deviation of the system operational design domain during automated lane change, if a driver who is overwhelmed by automated lane change function stop advance notice and operation takeover notice performs excessive operation intervention, override can be avoided, which enables shift to fallback control of the automated lane change function, can prevent acceleration/deceleration, lane deviation, and the like due to excessive operation intervention, and is advantageous in smooth operation takeover.

BRIEF DESCRIPTION OF DRAWINGS

FIG. 4 is a flowchart showing prevention control of override due to excessive operation intervention at a time of ODD deviation during automated lane change.

FIG. 5A is a schematic plan view exemplifying automated lane change.

FIG. 5B is a schematic plan view exemplifying ODD deviation during automated lane change.

FIG. 5C is a schematic plan view exemplifying excessive steering override at the time of ODD deviation during automated lane change and prevention control thereof.

FIG. 8A is a schematic plan view exemplifying automated lane change.

FIG. 8B is a schematic plan view exemplifying excessive brake/accelerator override at the time of ODD deviation (lane marking lost) during automated lane change and prevention control thereof.

FIG. 10A is a schematic plan view exemplifying automated lane change in a diversion section.

FIG. 10B is a schematic plan view exemplifying ODD deviation during automated lane change in the diversion section.

FIG. 10C is a schematic plan view exemplifying prevention control of excessive brake/accelerator override at the time of ODD deviation during automated lane change in the diversion section.

DETAILED DESCRIPTION OF THE DRAWINGS

Hereinafter, an embodiment of the present invention will be described in detail with reference to the drawings.

Figure 1:
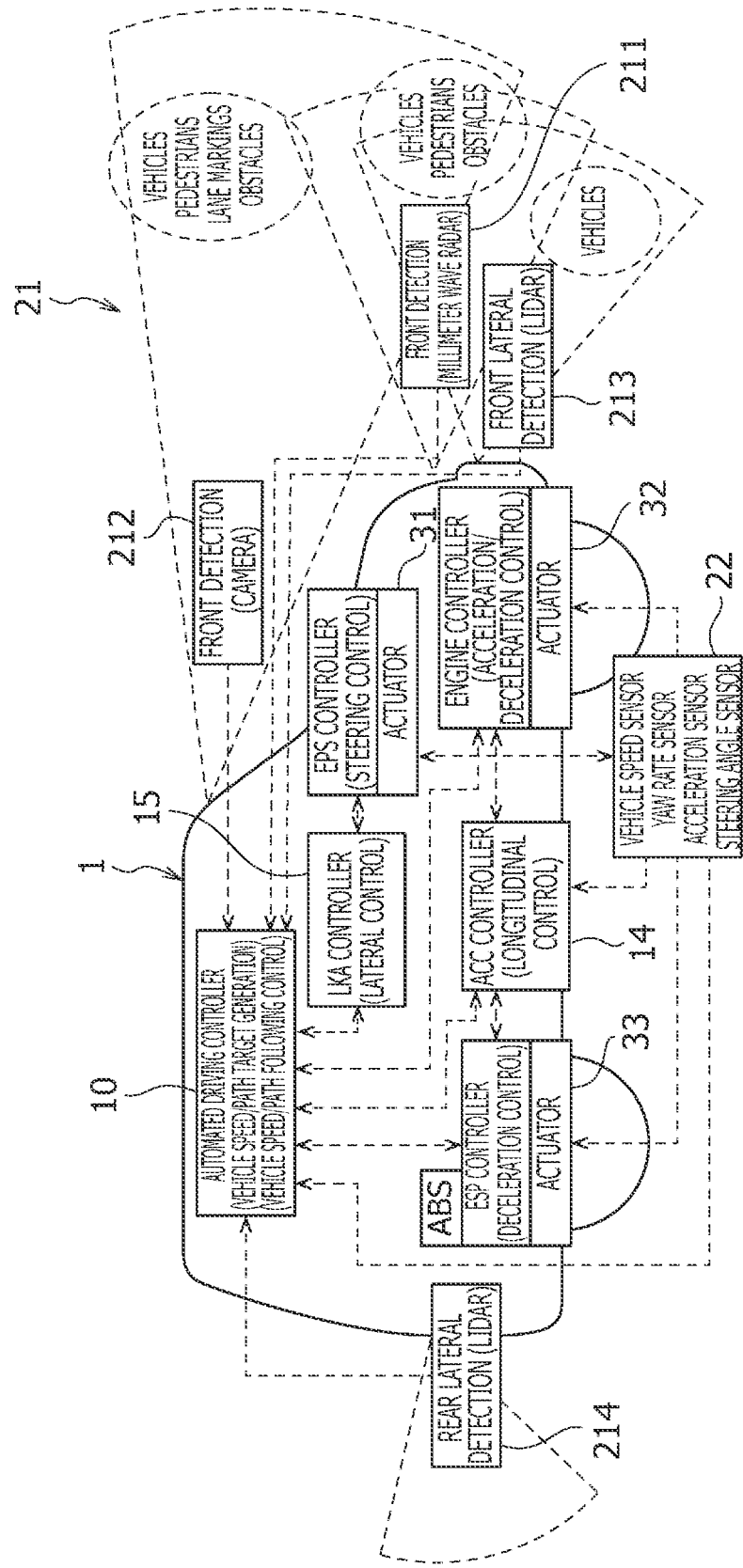
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them and performing path following control and partially automated in-lane driving (PADS) and automated lane change (PALS) in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
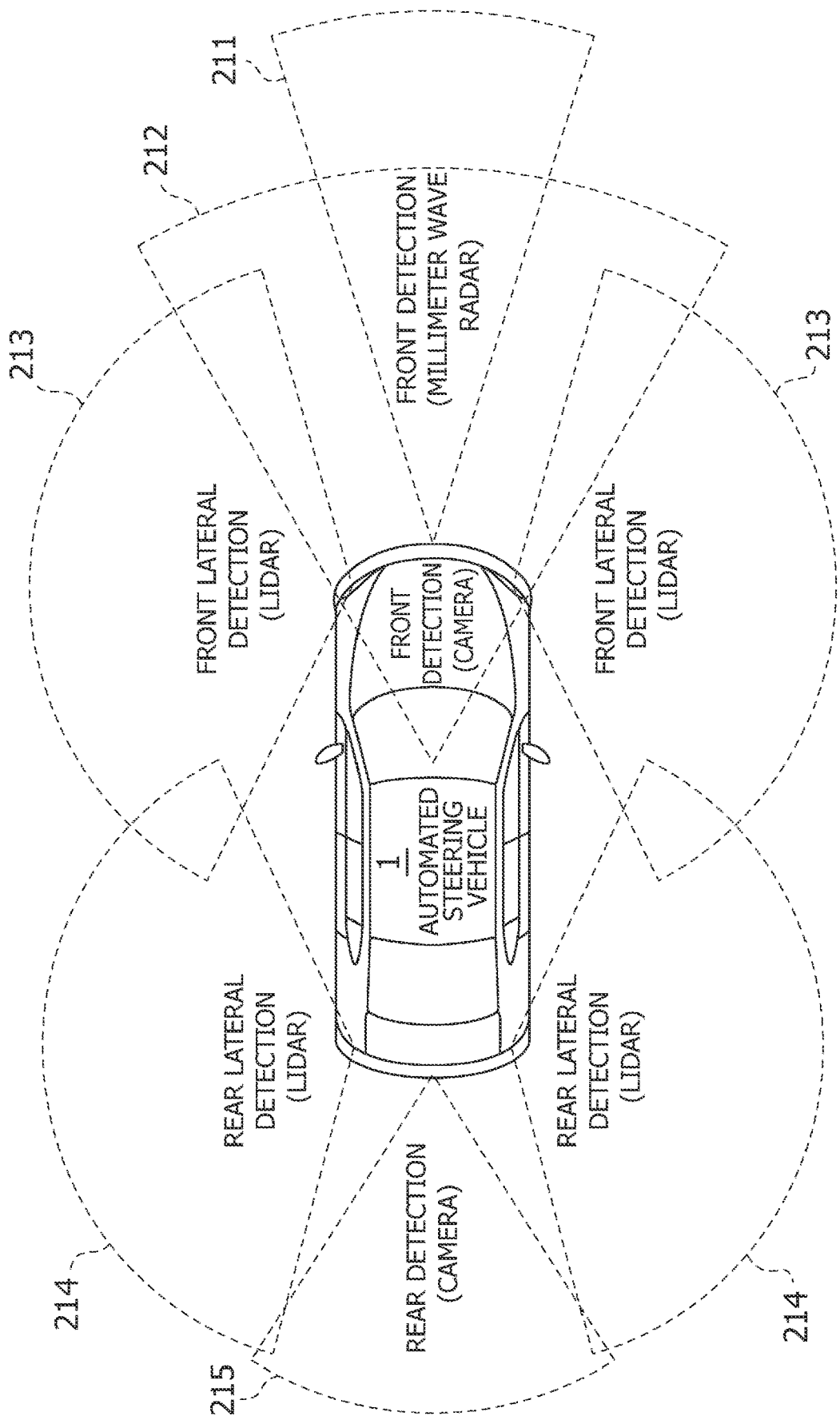
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions within a predetermined distance in the front, rear, left, and right directions of the vehicle.

Figure 3:
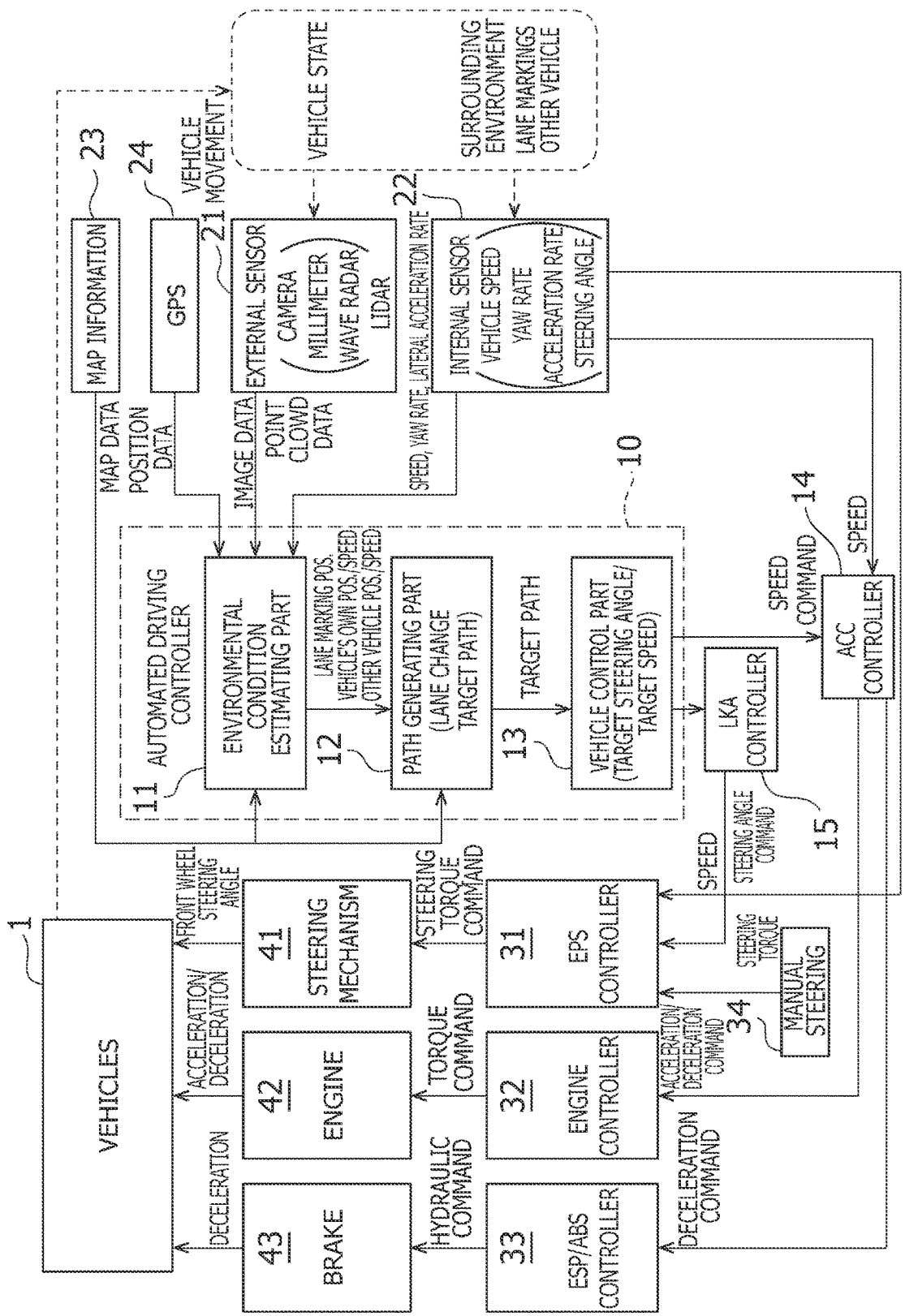
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by matching the vehicle's own positional information by positioning means 24 such as a GPS and map information, and on the basis of external data such as the image data and point cloud data obtained by the external sensor 21, estimates positions of lane markings of the vehicle's own driving lane and the neighboring lanes, and positions and speeds of other vehicles. In addition, it acquires the movement state of the vehicle itself from internal data measured by the internal sensor 22.

The path generating part 12 generates a target path from the vehicle's own position estimated by the environmental condition estimating part 11 to an arrival target. It refers to map information 23 and generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Outline of Partially Automated In-Lane Driving System and Partially Automated Lane Change System Next, outlines of a partially automated in-lane driving system (PADS) and a partially automated lane change system (PALS) will be explained on the assumption of traveling on a highway.

Partially automated in-lane driving (PADS driving) is enabled in a state in which both ACC controller 14 included in the ACCS and LKA controller 15 included in the LKAS are operating together with the automated driving controller 10.

At the same time as operation of the partially automated in-lane driving system, the automated driving controller 10 (path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after $\Delta t$ seconds from a relationship between a yaw rate $\gamma$ and lateral acceleration ($d^2y/dt^2$) occurring due to vehicle movement by the vehicle's own position and movement characteristics of the vehicle itself, that is, a front wheel steering angle $\delta$ occurring when a steering torque T is applied to the steering mechanism 41 during traveling at a vehicle speed V, gives a steering angle command that makes the lateral displacement to "yt" after $\Delta t$ seconds to the EPS controller 31 via the LKA controller 15, and gives a speed command that makes the speed to "Vt" after $\Delta t$ seconds to the ACC controller 14.

Although the ACC controller 14, LKA controller 15, EPS controller 31, engine controller 32, and ESP/ABS controller 33 operate independently of automatic steering, they are also operable according to command input from the automated driving controller 10 while a partially automated in-lane driving function (PADS) and the partially automated lane change system (PALS) are operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33.

That is, in a case in which there is no vehicle ahead, the ACC function performs constant speed cruise by setting a cruise control set speed as the target speed; and in a case of having caught up with the vehicle ahead (in a case in which a speed of the vehicle ahead is slower than the cruise control set speed), the ACC function performs following cruise following the vehicle ahead while maintaining an inter-vehicle distance corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the LKA controller 15 and EPS controller 31 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

The partially automated lane change system (PALS) enables the system to automatically perform lane change by an instruction or approval of the driver and is implemented by combining longitudinal control (speed control and inter-vehicle distance control) by the ACC controller 14 and lateral control (target path following control by automatic steering) by the LKA controller 15 in the same manner as partially automated driving (PADS driving).

At the same time as activation of the partially automated lane change system, the automated driving controller 10 (path generating part 12) constantly generates a target path for changing the lane from a currently travelling lane to a neighboring lane on the basis of the external information (lane markings of the vehicle's own driving lane and the neighboring lane, and positions and speeds of other vehicles driving in the vehicle's own driving lane and the neighboring lane) obtained by the environmental condition estimating part 11 through the external sensor 21 and the internal information (vehicle speed, yaw rate, and acceleration) obtained by the internal sensor 22.

The automated lane change target path is a path that leads from the currently travelling lane to a state of driving at the center of the neighboring lane through lane change; for other vehicles driving in the neighboring lane, their future positions and speeds are predicted, and automated lane change to the neighboring lane by automatic steering is performed if it is determined there is no other vehicle in a front area ZF, a rear area ZR, and lateral area ZL of the neighboring lane configured according to the vehicle's speed and the driver instructs lane change by operating a turn signal or the like as shown in FIGS. 5A to 10C.

ODD Deviation Detection and Monitoring

In the partially automated in-lane driving system (PADS) and the partially automated lane change system (PALS), a system operational design domain (ODD) which is a condition allowing for execution of partially automated in-lane driving and automated lane change is defined by a designer's intention. The operational design domain (ODD) includes the following.

Road conditions: highway (two or more lanes on one side, dashed-line lane marking, and main line curvature of 300 R or more), and general road (three or more lanes on one side, dashed-line lane marking, lane width of 3.25 m or more, and straight line);

Geographical conditions: other than urban areas and mountainous areas (geo fence);

Environmental conditions: weather (clear sky, cloudy, or no wind), and time zone (night restriction);

Traffic environments: movement of other vehicles (cutting-in and sudden braking), and traffic rules (speed limit and lane change prohibition)

Vehicle states: vehicle speed (within speed limit), longitudinal and lateral acceleration/deceleration (within acceleration/deceleration limits), within other system limits, and no system failure; and Driver states: no driver abnormality, no driver erroneous operation, and the like.

Conditions that should be particularly monitored among the above include suddenly changing environmental conditions like rainfall, snowfall, gusts and crosswinds, and a road surface change (wet and accumulation of snow), and they can be detected from image analysis (for example, image analysis of the road surface for rainfall and snowfall, and image analysis of a streamer for crosswind) or the like of the camera included in the front detection means 212, and it is also determined that ODD deviation has occurred when the ESP (vehicle behavior stabilization control system/skidding prevention apparatus) is activated due to a road surface change or road side slope.

In addition, as a driving operation environment, it is determined that ODD deviation has occurred also when hands-off time continuation (steering torque sensor), seat belt release (seat belt switch), wiper high-speed operation (wiper switch), door open (door switch), system off (system off switch), or gear position change (gear position switch) is detected.

Furthermore, for the partially automated lane change system (PALS), it is determined that ODD deviation has occurred also when intrusion, cutting-in, or the like of another vehicle to the front area ZF, rear area ZR, and lateral area ZL of the neighboring lane including the above-described target path is detected.

During the operation of the partially automated in-lane driving system (PADS) or during automated lane change by the partially automated lane change system (PALS), the environmental condition estimating part 11 monitors whether the driving states of the vehicle, road conditions, geographical conditions, environmental conditions, and traffic conditions such as movement of other vehicles are kept within the range of the ODD on the basis of the external information obtained through the external sensor 21, the vehicle information obtained by the internal sensor 22, the map information 23, and the positional information obtained by the positioning means 24, and if ODD deviation is detected, driving operation authority is delegated from the system to the driver, and driving is shifted from the partially automated in-lane driving or automated lane change to manual driving. This point will be described later.

Override Function

During the operation of the partially automated in-lane driving system (PADS) or during automated lane change by the partially automated lane change system (PALS), both longitudinal control system (ACCS) and lateral control system (LKAS) can be overridden by the driver.

The longitudinal control system (ACCS) is overridden if an engine torque request by accelerator pedal operation of the driver or a deceleration request by brake pedal operation is equal to or greater than a corresponding override threshold value. These override threshold values are set to an accelerator operation amount (engine torque command value) or a brake operation amount (ESP hydraulic command value) based on which it is determined that the driver has intentionally performed acceleration/deceleration operation, and both are set according to the acceleration/deceleration characteristic and driving state of the vehicle.

That is, the ACC override stops ACC control if an operation amount or operation speed based on which it is determined that the driver has performed accelerator pedal operation or brake pedal operation with an intention of acceleration or deceleration with respect to the control vehicle speed is applied to the accelerator pedal or brake pedal, and shifts to driving by the driver's accelerator and brake operation.

The lateral control system (LKAS) for performing automatic steering for lane keeping support and automated lane change is overridden if a steering torque by the driver's manual steering 34 is equal to or greater than the override threshold value. The override threshold value by the steering intervention is set according to the steering characteristic and driving state of the vehicle.

That is, the steering override stops automatic steering and LKA control if an operation amount or operation speed based on which it is determined that the driver has performed steering with an intention of additive steering (in the same direction) or subtractive steering (in the opposite direction) with respect to the control steering torque is applied to a steering system, and shifts to driving by the driver's manual steering.

System Function Stop and Shift to Fallback Control Mode at ODD Deviation

During automated lane change by the partially automated lane change system (PALS), if ODD deviation due to, for example, a gust is detected, the automated lane change function (ACC and automatic steering functions) shifts to a fallback control mode. At this time, first the driver is notified of automated lane change function stop (ACC and automatic steering function stop) and an operation takeover request (takeover request), and automated lane change function (ACC and automatic steering functions) fallback control is started after the elapse of a prescribed waiting time (for example, four seconds).

The ACC fallback control gradually decreases an acceleration/deceleration command value (vehicle speed command) input into the engine controller 32 to 0 km/h/s with a predetermined inclination, and also gradually decreases a deceleration command value input into the ESP controller to 0 m/s$^2$ with a predetermined inclination.

Automatic steering fallback control gradually decreases the steering torque command value (steering angle command) input into the EPS controller to 0 Nm with the predetermined inclination. When ACC and automatic steering fallback control is completed, accelerator/brake operation and steering operation are taken over by the driver.

As described above, when ODD deviation is detected during automated lane change, the ACC and automatic steering functions shift to the fallback control mode; and at that time as already described above, by the driver who is overwhelmed by the automated lane change stop and takeover request notice, lane departure due to excessive steering intervention (steering override) and acceleration/deceleration behavior due to excessive accelerator/brake operation intervention (ACC override) may occur.

Excessive Operation Prevention Function at ODD Deviation

The automated driving controller 10 according to the present invention has an excessive operation prevention function that, at the time of automated lane change stop and takeover of steering and braking/driving by the driver when an event that deviates from the ODD is detected during automated lane change, changes the ACC override threshold value and steering override threshold value to a value greater than during normal operation in a period from automated lane change stop advance notice to the automated lane change stop (for example, elapse of four seconds after notification-ACC and automatic steering fallback control start-ACC and automatic steering fallback control end).

By increasing the ACC override threshold value and steering override threshold value at the time of ODD deviation, an override state is avoided and the ACC and automatic steering are continuing, thereby excessive acceleration/deceleration and steering are suppressed, and lane departure and the like can be avoided even if the driver who is overwhelmed by the automated lane change stop performs excessive accelerator/brake operation intervention or steering intervention and applies a large operation amount that would lead to acceleration/deceleration and lane departure before threshold value change.

1. ACC Override Threshold Value

First, an excessive operation prevention function by changing the ACC override threshold value will be described below. An excessive steering prevention function by changing the steering override threshold value will be described later.

Accelerator Override Threshold Value within System ODD/During Normal Operation

If an engine torque command value by the driver's accelerator depression is greater than an engine torque command value for maintaining ACC set speed (cruise set speed or vehicle ahead following speed) or ACC set acceleration, accelerator override is reached and the driver's accelerator operation is given priority. The threshold value is obtained from an engine torque map set according to a vehicle speed and gear position, and an engine torque command value that gives acceleration corresponding to, for example, a speed of 4 km/h, to the ACC set speed or an engine torque command value causing acceleration corresponding to 0.3 m/s$^2$ to the ACC set acceleration is set as a threshold value Td.

Brake Override Threshold Value within System ODD/During Normal Operation

If an ESP hydraulic command causing deceleration with respect to the ACC set speed (cruise set speed or vehicle ahead following speed) or ACC set acceleration is given by the driver's brake depression, brake override is reached and the driver's brake operation is given priority. An ESP hydraulic command value that causes deceleration corresponding to, for example, a speed of 2 km/h with respect to the ACC set speed or an ESP hydraulic command value that causes deceleration corresponding to 0.2 m/s$^2$ with respect to the ACC set acceleration is set as a threshold value Pd.

Accelerator Override Threshold Value at ODD Deviation

A value greater than the ACC accelerator override threshold value during normal operation, preferably in the range of 120% to 250%, and more preferably in the range of 150% to 220% of the ACC accelerator override threshold value during normal operation is selected. For example, an engine torque command value that gives acceleration corresponding to a speed of 8 km/h with respect to the ACC set speed or an engine torque command value that causes acceleration corresponding to 0.6 m/s$^2$ with respect to the ACC set acceleration is set as a threshold value To.

Brake Override Threshold Value at ODD Deviation

A value greater than the ACC brake override threshold value during normal operation, preferably in the range of 120% to 250%, and more preferably in the range of 150% to 220% of the ACC brake override threshold value during normal operation is selected. For example, an ESP hydraulic command value that causes deceleration corresponding to a speed of 4 km/h with respect to the ACC set speed or an ESP hydraulic command value that causes deceleration corresponding to 0.4 m/s$^2$ with respect to the ACC set acceleration is set as a threshold value Po.

2. Steering Override Threshold Value

The excessive steering prevention function by the steering override threshold value change will be described below.

Steering Override Threshold Value within System ODD/During Normal Operation

For an additive steering override threshold value during normal operation within the system ODD, a steering torque (steering torque calculated from the vehicle speed-steering angle-steering torque map) corresponding to a steering angle by which a virtual lateral displacement "y't" for reaching a virtual lateral position after "t" seconds becomes "yt+α" is set as an additive steering override threshold value T1$d$, where "α" is a constant determined based on vehicle speed.

In the case of subtractive steering, a value that is perceptible (determined by the steering angle, steering angle speed, or the like) and is applied in a direction of reducing the steering torque to a value (steering torque target value) obtained by converting a steering angle by which a virtual lateral displacement "yt" for reaching a virtual lateral position after "t" seconds becomes "yt+α" into a steering torque is set as a subtractive steering override threshold value T2$d$, where "α" is a constant determined based on vehicle speed.

Steering Override Threshold Value at ODD Deviation

For an additive steering override threshold value, a value obtained by converting a steering angle calculated from virtual lateral displacement "y"t" (=yt+β, where β>α) at the time of ODD Deviation and the movement characteristics of the vehicle with respect to the virtual lateral displacement "yt" within the system ODD/during normal operation into a steering torque is set as an additive steering override threshold value T1o.

For a subtractive steering override threshold value, a value obtained converting a steering angle calculated from virtual lateral displacement "y"t" (=yt-γ, where "γ" is greater than a lateral displacement corresponding to a steering torque X' Nm) at the time of ODD deviation and the movement characteristic of the vehicle with respect to the virtual lateral displacement "yt" within the system ODD/during normal operation into a steering torque is set as a subtractive steering override threshold value T2o.

Excessive Operation Prevention Flow at ODD Deviation During Automated Lane Change Next, an excessive operation prevention flow by override threshold value change when an ODD deviation event occurs during automated lane change will be described with reference to FIG. 4.

(1) Automated Lane Change by Partially Automated Lane Change System (PALS)

When the driver performs turn signal operation to a neighboring lane direction in a state in which it is determined that there is no other vehicle in the front area ZF, rear area ZR, and lateral area ZL of the neighboring lane (automated lane changeable flag is on) during PADS (ACCS and LKAS) driving by the partially automated in-lane driving system, automated lane change is started toward the center of the neighboring lane as a target position (step 100).

(2) ODD Deviation Determination

During automated lane change by the partially automated lane change system (PALS), it is monitored by the environmental condition estimating part 11 whether the driving states of the vehicle, road conditions, geographical conditions, environmental conditions, and traffic conditions such as movement of other vehicles are kept within the range of the ODD on the basis of the external information obtained through the external sensor 21, the vehicle information obtained by the internal sensor 22, the map information 23, and the positional information obtained by the positioning means 24 (step 101).

(3) ODD Deviation Flag

Figure 6A:
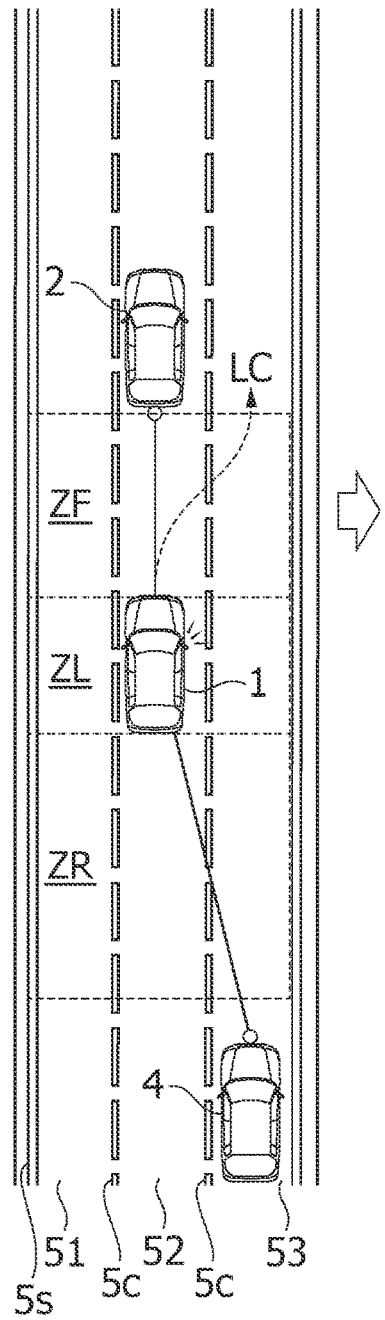
FIG. 6A is a schematic plan view exemplifying automated lane change.
Figure 6B:
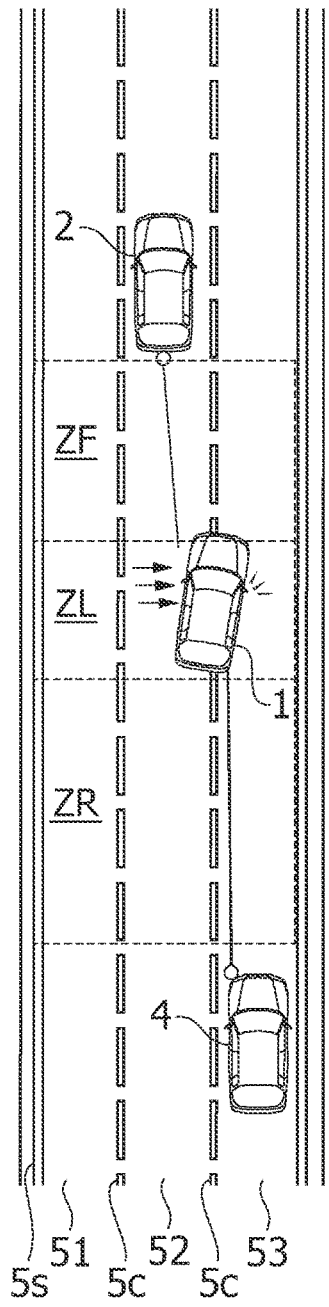
FIG. 6B is a schematic plan view exemplifying ODD deviation during automated lane change.
Figure 7A:
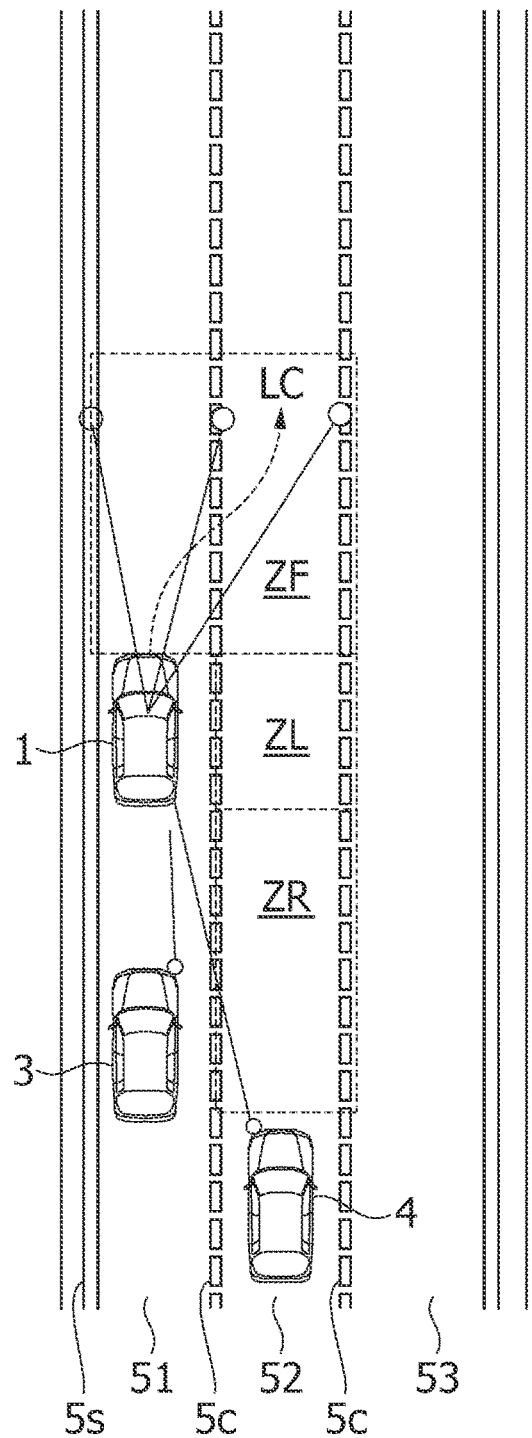
FIG. 7A is a schematic plan view exemplifying automated lane change.
Figure 7B:
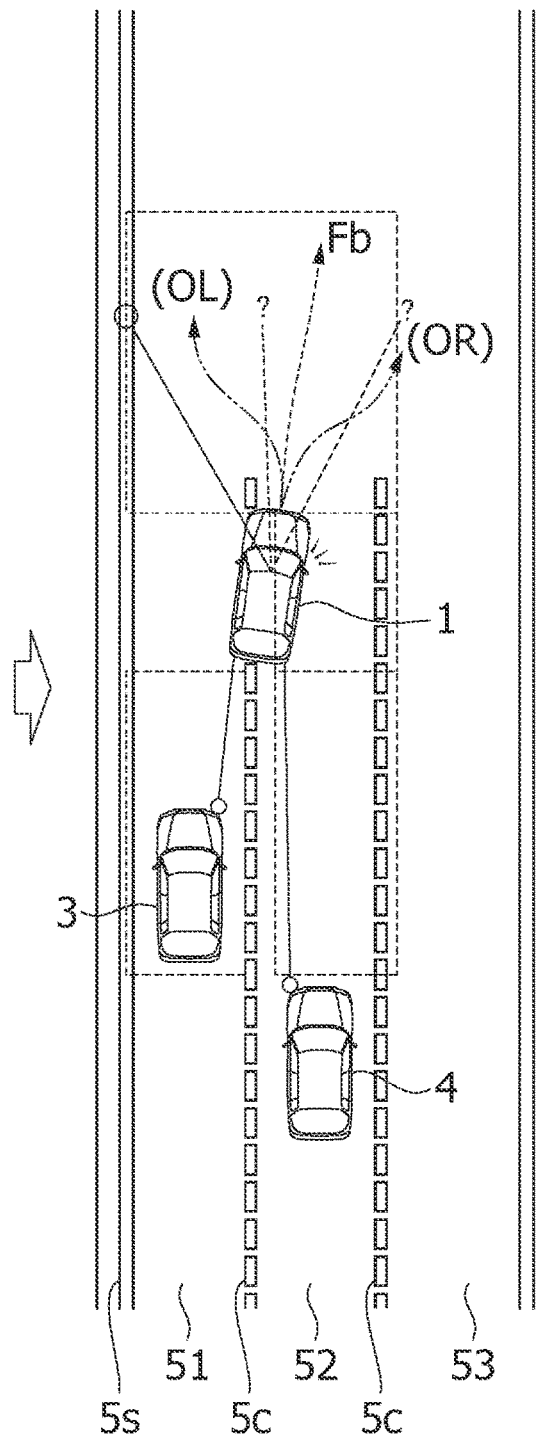
FIG. 7B is a schematic plan view exemplifying excessive steering override at the time of ODD deviation (lane marking lost) during automated lane change and prevention control thereof.
Figure 9A:
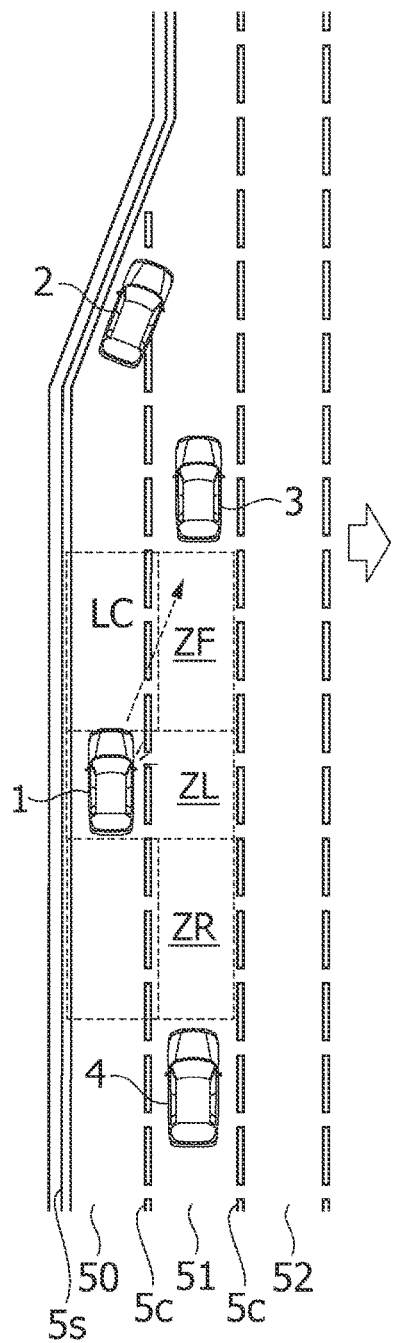
FIG. 9A is a schematic plan view exemplifying automated lane change in a merging section.
Figure 9B:
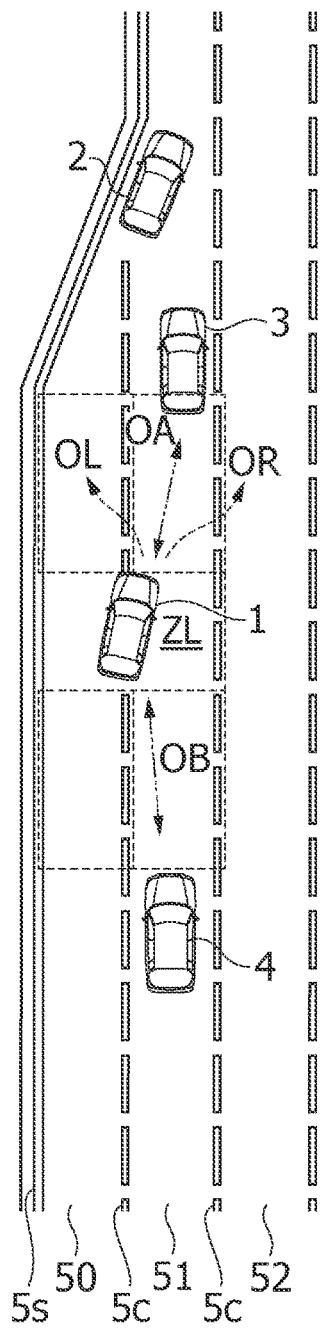
FIG. 9B is a schematic plan view exemplifying ODD deviation during automated lane change in the merging section.

During automated lane change by the PALS, if it is determined that ODD deviation has occurred on the basis that, for example, a gust from the lateral direction is received as shown in FIGS. 5B and 6B, a lane marking lane lost state such as disappearance of a lane marking continues for a predetermined time as shown in FIGS. 7B and 8B, intrusion, cutting-in, or the like of another vehicle to the front area ZF, rear area ZR, and lateral area ZL is detected as shown in FIGS. 9B and 10B, an ODD deviation flag is set (step 102).

(4) Automated Lane Change Stop and Operation Takeover Notice

At the same time, the driver is notified of automated lane change stop (ACC and automatic steering function stop) and operation takeover due to ODD deviation by display in a head-up display or meter panel or voice. At the same time, counting of a waiting time (for example, four seconds) until shift to ACC and automatic steering fallback control is started.

(5-1) ACC Override Threshold Value Change

At the same time, the accelerator override threshold value Td and brake override threshold value Pd of the ACC within the system ODD/during normal operation are altered to the accelerator override threshold value To (To>Td) and brake override threshold value Po (Po>Pd) at the time of ODD deviation, respectively (step 103).

(5-2) Steering Override Threshold Value Change

At the same time, the steering override threshold values (additive direction T1d and subtractive direction T2d) within the system ODD/during normal operation are altered to the steering override threshold values (additive direction T1o and subtractive direction T2o) at the time of ODD deviation (step 203).

That is, a value is calculated by converting a steering angle calculated from lateral movement distance "yt" at this time point and the movement characteristics of the vehicle into a steering torque, and the steering override threshold values (additive direction T1o and subtractive direction T2o) at the time of ODD deviation are set.

(6) Determination of Whether Accelerator/Brake Operation and Manual Steering are Performed At this point, the ACC and automatic steering are still operating, and whether accelerator operation or brake operation is performed by the driver or not is determined with position sensors attached to accelerator and brake pedals; and at the same time, whether manual steering 34 is performed is determined with a torque sensor attached to the EPS controller 31 (step 104).

(7-1) Acceleration/Deceleration Request Determination

When the accelerator operation or brake operation by the driver is detected in step 104, it is determined whether the override by the driver is an acceleration request or a deceleration request (step 105).

(8-1) Accelerator Override Determination

In the case of the acceleration request, the engine torque command value by the driver's accelerator depression is compared with the override threshold value To (step 106).

i) If the engine torque command value T>the override threshold value To, it is determined that the operation is accelerator override and the override is carried out immediately, shifting to manual driving.

ii) If the engine torque command value T≤To, the override is not carried out, and the ACC and automatic steering continue.

(9-1) Brake Override Determination

In the case of the deceleration request, the ESP hydraulic command value by the driver's brake depression is compared with the override threshold value Po (step 107).

i) If the ESP hydraulic command value P>Po, it is determined that the operation is brake override and the override is carried out immediately, shifting to manual driving.

ii) If the ESP hydraulic command value P≤Po, the override is not carried out, and the ACC and automatic steering continue.

(7-2) Steering Direction Determination

When it is determined that manual steering is performed from a detection value of the torque sensor attached to the EPS controller 31 in step 104, a steering direction of the manual steering 34 is determined (step 205).

For the determination of the steering direction, it is determined to be additive steering if the torque is applied to the steering torque value calculated in the step 203 in a direction of increasing the steering torque, and it is determined to be subtractive steering if the torque is applied in a direction of decreasing the steering torque.

(8-2) Additive Steering Override Determination

If the steering direction is determined to be additive steering in the steering direction determination, the steering torque is compared with the additive steering override threshold value T1o (step 206).

i) If the steering torque>the additive steering override threshold value T1o, it is determined that the operation is override and the override is carried out immediately, shifting to manual driving.

ii) If the steering torque≤the additive steering override threshold value T1o, the override is not carried out, and ACC and automatic steering continues.

(9-2) Subtractive Steering Override Determination

If the steering direction is determined to be subtractive steering in the steering direction determination, the steering torque is compared with the subtractive steering override threshold value T2o (step 207).

i) If the steering torque>the subtractive steering override threshold value T2o, it is determined that the operation is override, and the override is carried out immediately, shifting to manual driving.

ii) If the steering torque the subtractive steering override threshold value T2o, the override is not carried out, and the ACC and automatic steering continue.

(10) Determination of Takeover Elapsed Time-ACC and Automatic Steering Fallback Control Start In the case where the ACC and automatic steering are continuing through the override determinations (steps 105-107 and steps 205-207), counting of an elapsed time from notifying automated lane change stop (ACC and automatic steering function stop) and operation takeover in step 102 is continued (step 108), and ACC and automatic steering fallback control is started when the waiting time (four seconds) passes (step 110).

ACC fallback control: the acceleration/deceleration command value (vehicle speed command) input into the engine controller 32 is gradually decreased to 0 km/h/s with the predetermined inclination, and also the deceleration command value input into the ESP controller 33 is decreased to 0 m/s² with the predetermined inclination.

Automatic steering fallback control: a steering torque command value input into the EPS controller is gradually decreased to 0 Nm with a predetermined inclination.

(11) ACC and Automatic Steering Fallback Control End-ACC and Automatic Steering Function Stop and Operation Takeover When the ACC and automatic steering fallback control ends, the ACC and automatic steering functions are stopped and operation takeover to the driver is performed (step 111), shifting to manual driving by the driver's accelerator/brake operation and steering (step 112).

Although override by excessive steering at the time of ODD deviation can be basically prevented by the override threshold value change as described above, if the manual steering is equal to or greater than the override threshold value in the above-described override determination (steps 206 and 207), the ACC and automatic steering functions will be overridden by the manual steering.

When the override threshold value is altered at the time of ODD deviation (step 203), by changing an upper limit value of the steering torque or steering angle (in inverse proportion to vehicle speed/decreases as vehicle speed increases) set according to vehicle speed in the EPS controller 31 to a value smaller than during normal operation within the system ODD, excessive steering can be prevented when it is overridden by the manual steering.

When the override threshold value at the time of ODD Deviation is altered (step 203), by changing a steering gain of the manual steering to a small value by the EPS controller 31, it is also possible to partially reflect the steering amount on the steering torque when it is overridden by the manual steering.

It is preferable that the override threshold values at the time of ODD deviation be kept from the ACC and automatic steering function stop advance notice and operation takeover notice to end of the fallback control. By doing so, operation takeover can be gradually performed in a state in which steering control by the automatic steering function and acceleration/deceleration control by the ACC function are partially active, smooth operation takeover can be performed, and in addition, because the override threshold values during normal operation are restored when the ACC and automatic steering fallback control is finished and shift to manual driving is completed, and thereby, there is advantage in that the state of being capable of override by operation intervention during normal operation is immediately reached when the system is returned to within the ODD.

Operation and Effects

As detailed above, because the driving control apparatus for the vehicle according to the present invention is configured so that the override threshold values serving as a determination criterion of operation intervention for stopping the ACC function and automatic steering function if an event that deviates from the ODD occurs during automated lane change by the partially automated lane change system (PALS) are altered to a value greater than during normal operation within the system ODD, effects of preventing excessive operation can be expected in cases as exemplified below.

Example 1: Environmental Condition; at ODD Deviation Due to Gust

For example, as shown in FIG. 5A, in a situation in which there is another vehicle 2 ahead in a lane 52 of the vehicle 1 and there is a following other vehicle 4 in the back of a right side neighboring lane 53 but the following other vehicle 4 is out of the rear area ZR and there is no other vehicle in the front area ZF, rear area ZR, and lateral area ZL of the neighboring lane 53, while the vehicle 1 is performing automated lane change LC from the vehicle's own driving lane 52 to the neighboring lane 53, the vehicle 1 receives a gust from the lateral direction as shown in FIG. 5B and it is determined that ODD deviation has occurred; when the automated lane change stop and steering and braking/driving takeover request are notified, even if the driver who is overwhelmed by the notification performs excessive steering operation, because the steering override threshold values serving as a determination criterion of steering intervention are altered to a value greater than during normal operation within the system ODD, override can be avoided, which enables shift to fallback control (Fb) in a state in which the ACC and automatic steering functions are continuing as shown in FIG. 5C, and can prevent right lane departure (OR) and left lane departure (OL) due to excessive steering intervention.

Figure 6C:
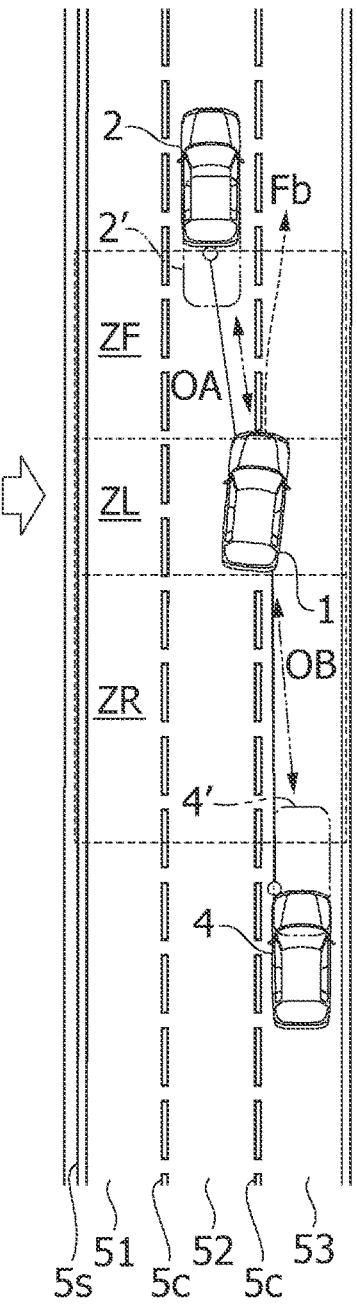
FIG. 6C is a schematic plan view exemplifying excessive brake/accelerator override at the time of ODD deviation during automated lane change and prevention control thereof.

As shown in FIG. 6A, in the same situation as in FIG. 5A, while the vehicle 1 is performing automated lane change LC from the vehicle's own driving lane 52 to the neighboring lane 53, the vehicle 1 receives a gust from the lateral direction as shown in FIG. 6B and it is determined that ODD deviation has occurred; when the automated lane change stop and steering and braking/driving takeover request are notified, even if the driver who is overwhelmed by the notification performs excessive brake operation or accelerator operation, because the ACC brake/accelerator override threshold values serving as a determination criterion of operation intervention are altered to a value greater than during normal operation within the system ODD, override can be avoided, which enables shift to fallback control (Fb) in the state in which the ACC and automatic steering functions are continuing as shown in FIG. 6C, and can prevent acceleration (OA) and deceleration (OB) and accompanying approach to other vehicles 2' and 4' due to excessive steering intervention.

Example 2: Road Condition; at ODD Deviation Due to Lane Marking Lane Lost

As shown in FIG. 7A, in a situation in which there is a following other vehicle 3 in the back of a lane 51 of the vehicle 1 and there is a following other vehicle 4 in the back of the right side neighboring lane 52 but the following other vehicle 4 is out of the rear area ZR and there is no other vehicle in the front area ZF, rear area ZR, and lateral area ZL of the neighboring lane 53, while the vehicle 1 is performing automated lane change LC from the vehicle's own driving lane 51 to the neighboring lane 52, a lane marking 5c of the neighboring lane 52 disappears as shown in FIG. 7B and it is determined that ODD deviation has occurred; when the automated lane change stop and steering and braking/driving takeover request are notified, even if the driver who is overwhelmed by the notification performs excessive steering operation, because the steering override threshold values serving as the determination criterion of steering intervention are altered to a value greater than during normal operation within the system ODD, override can be avoided, which enables shift to fallback control (Fb) in the state in which the ACC and automatic steering functions are continuing, and can prevent right lane departure (OR) and left lane departure (OL) due to excessive steering intervention.

As shown in FIG. 8A, in the same situation as in FIG. 7A, while the vehicle 1 is performing automated lane change LC from the vehicle's own driving lane 51 to the neighboring lane 52, the lane marking 5c of the neighboring lane 52 disappears as shown in FIG. 8B and it is determined that ODD deviation has occurred; when the automated lane change stop and steering and braking/driving takeover request are notified, even if the driver who is overwhelmed by the notification performs excessive brake operation or accelerator operation, because the ACC brake/accelerator override threshold values serving as the determination criterion of operation intervention are altered to a value greater than during normal operation within the system ODD, override can be avoided, which enables shift to fallback control (Fb) in the state in which the ACC and automatic steering functions are continuing, and can prevent acceleration (OA) and deceleration (OB) and accompanying approach to the other vehicles 2' and 4' due to excessive operation intervention.

Example 3; Traffic Environment; at ODD Deviation Due to Sudden Braking of Other Vehicle in Lane Merging Section As shown in FIG. 9A, in a merging section from a ramp way to a main line at an interchange, a junction, or the like, in a situation in which there is a preceding other vehicle 2 ahead in a lane 50 (ramp way) of the vehicle 1 and there is a preceding other vehicle 3 ahead and a following other vehicle 4 in the back of the right side neighboring lane 51 (main line) but they are all out of the front area ZF and rear area ZR and there is no other vehicle in the front area ZF, rear area ZR, and lateral area ZL of the neighboring lane 53, when the vehicle 1 merges from the vehicle's own driving lane 50 (ramp way) to the right side neighboring lane 51 (main line) by automated lane change LC, the preceding other vehicle 2 merges to the neighboring lane 51 (main line) and the preceding other vehicle 3 in the neighboring lane 51 suddenly brakes and enters the front area ZF as shown in FIG. 9B and it is determined that ODD deviation has occurred; when the automated lane change stop and steering and braking/driving takeover request are notified, even if the driver who is overwhelmed by the notification performs excessive steering operation or brake operation, because the steering override threshold values serving as the determination criterion of steering intervention and the ACC brake/accelerator override threshold values serving as the determination criterion of operation intervention are altered to a value greater than during normal operation within the system ODD at the same time as ODD deviation, override can be avoided, which enables shift to fallback control (Fb) in the state in which the ACC and automatic steering functions are continuing as shown in FIG. 9C, and can prevent lane departure and meandering due to excessive steering intervention and acceleration (OA), deceleration (OB), and accompanying approach to the other vehicles 3 and 4 due to excessive operation intervention.

Figure 9C:
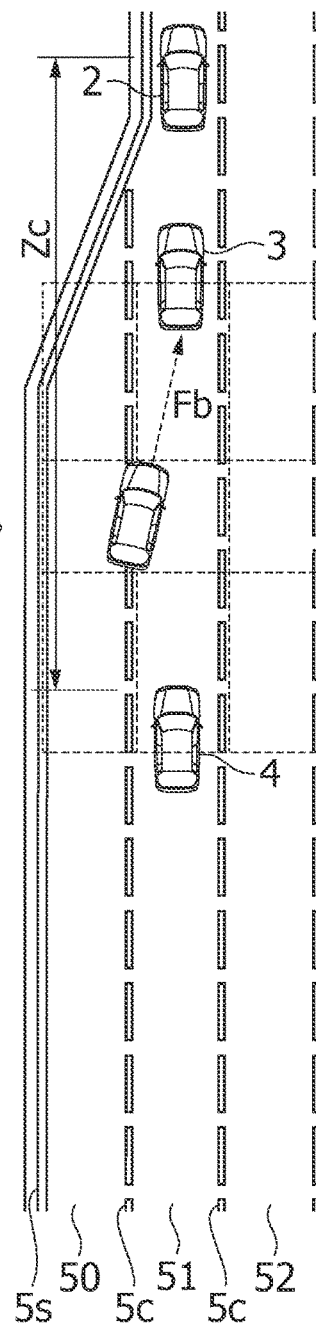
FIG. 9C is a schematic plan view exemplifying prevention control of excessive brake/accelerator override at the time of ODD deviation during automated lane change in the merging section.

As shown in FIG. 9C, a lane merging section Zc may be set as out of the ODD, and at the same time as the vehicle 1 enters the lane merging section Zc on the basis of the map information 23 and the positional information obtained by the positioning means 24, the steering override threshold values serving as the determination criterion of steering intervention and the ACC brake/accelerator override threshold values serving the determination criterion of operation intervention may be altered to a value greater than during normal operation within the system ODD.

Example 4; Traffic Environment; at ODD Deviation Due to Cutting-in of Other Vehicle in Lane Diversion Section As shown in FIG. 10A, in a diversion section from a main line to a ramp way at an interchange, a junction, or the like, in a situation in which there is a preceding other vehicle 2 ahead in the lane 51 (main line) of the vehicle 1 but it is out of the front area ZF and there is no other vehicle in the front area ZF of the left side neighboring lane 50 (ramp way), when the vehicle 1 diverts from the vehicle's lane 51 (main line) to the neighboring lane 50 (ramp way) by automated lane change LC, the preceding other vehicle 2 decelerates and changes to the left lane, cuts in ahead, and enters the front area ZF as shown in FIG. 10B and it is determined that ODD deviation has occurred; when the automated lane change stop and steering and braking/driving takeover request are notified, even if the driver who is overwhelmed by the notification performs excessive steering operation or brake operation, because the steering override threshold values serving as the determination criterion of steering intervention and the ACC brake/accelerator override threshold values serving as the determination criterion of operation intervention are altered to a value greater than during normal operation within the system ODD at the same time as ODD deviation, override can be avoided, which enables shift to fallback control (Fb) in the state in which the ACC and automatic steering functions are continuing as shown in FIG. 10C, and can prevent lane departure and meandering due to excessive steering intervention and acceleration (OA), deceleration (OB), and accompanying approach to the other vehicles 2 and 4 due to excessive operation intervention.

As shown in FIG. 10C, a lane diversion section Zd may be set as out of the ODD, and at the same time as the vehicle 1 enters the lane diversion section Zd, the steering override threshold values serving as the determination criterion of steering intervention and the ACC brake/accelerator override threshold values serving as the determination criterion of operation intervention may be altered to a value greater than during normal operation within the system ODD.

The embodiment shows the case in which both ACC function (longitudinal control) and automatic steering function (lateral control) shift to fallback control at the time of ODD deviation, it is possible to configure to shift only one function to fallback control according to contents of an ODD deviation event.

Furthermore, although the embodiment is operable even in a form in which only one of the ACC override threshold value change and steering override threshold value change is applied, a form in which only one of the accelerator override threshold value and brake override threshold value is applied, or a form in which only one of the additive steering override threshold value and subtractive steering override threshold value is applied, it is preferable to carry out all the threshold value changes concurrently as described above.

Although the embodiment has described in the case in which the accelerator override threshold value is set based on the engine torque request by the driver's accelerator pedal operation, the accelerator override threshold value can also be configured to be set based on the driver's accelerator pedal depression, that is, an accelerator pedal position.

In the same manner, although the embodiment has described the case in which the brake override threshold value is set based on the deceleration request by the driver's brake pedal operation, the brake override threshold value can also be configured to be set based on the driver's brake pedal depression, that is, a brake pedal position.

Although the embodiment has exemplified the case in which the steering override threshold value is set based on the steering torque, the steering override threshold value can also be configured to be set based on the steering angle, steering angle speed, or the like.

Although some embodiments of the present invention have been described above, the present invention is not limited to the embodiments, various modifications and changes are possible within the scope of the present invention.

What is claimed is:

1. A driving control apparatus for a vehicle, comprising:
    an environmental condition estimating part including a surrounding recognition function for recognizing a vehicle's lane and neighboring lanes and other vehicles in the respective lanes and a function for obtaining the vehicle's moving state;
    a path generating part for generating a target path on the basis of information obtained by the environmental condition estimating part; and
    a vehicle control part for performing speed control and steering control for causing the vehicle to follow the target path, and having:
    an ACC function for performing constant speed cruise according to the target speed when there is no preceding other vehicle in the vehicle's lane and performing following cruise by maintaining a predetermined inter-vehicle distance when there is a preceding other vehicle;
    an LKA function for maintaining cruise in the vehicle's lane by following control to the target path;
    a function for performing automated lane change to a neighboring lane when there is no other vehicle in a predetermined range in the neighboring lane;
    an override function for stopping the automated lane change function by a driver's operation intervention; and
    a function for performing fallback control of the automated lane change function, with notifying the driver of stopping the automated lane change function and operation takeover, at a time of deviation of a system operational design domain during operation of the automated lane change function,
    characterized in that override threshold values serving as a determination criterion of the operation intervention for stopping the automated lane change function at the time of deviation of the system operational design domain are configured to be altered to a value greater than during normal operation within the system operational design domain.

2. The driving control apparatus for the vehicle according to claim 1, wherein the deviation of the system operational design domain is determined on the basis that any of vehicle states obtained by the environmental condition estimating part, traffic environments including cutting-in and sudden braking of other vehicles, environmental conditions including a road surface change, and road conditions including disappearance of a lane marking, reduction in a number of lanes, and a lane merging section and a lane diversion section obtained by the environmental condition estimating part using map information and positioning means deviates from the system operational design domain.

3. The driving control apparatus for the vehicle according to claim 1, wherein the override threshold values include an accelerator override threshold value serving as a determination criterion of accelerator operation intervention and/or a brake override threshold value serving as a determination criterion of brake operation intervention.

4. The driving control apparatus for the vehicle according to claim 1, wherein the override threshold values include a steering override threshold value serving as a determination criterion of steering operation intervention.

5. The driving control apparatus for the vehicle according to claim 1, wherein the override threshold values at the time of deviation of the system operational design domain are configured to be kept from the notification of stopping the automated lane change function and operation takeover to end of the fallback control.

* * * * *